United States Patent
Bito et al.

[11] Patent Number: 5,939,224
[45] Date of Patent: Aug. 17, 1999

[54] NONAQUEOUS ELECTROLYTE SECONDARY BATTERY

[75] Inventors: Yasuhiko Bito, Minamikawachi-gun; Toshihide Murata, Izumiotsu; Shuji Ito, Akashi; Yoshinori Toyoguchi, Yao, all of Japan

[73] Assignee: Matsushita Electric Industrial Co, Ltd., Osaka, Japan

[21] Appl. No.: 08/864,941

[22] Filed: May 29, 1997

[30] Foreign Application Priority Data

May 31, 1996 [JP] Japan .................................. 8-139032

[51] Int. Cl.$^6$ ...................................... H01M 4/58
[52] U.S. Cl. ...................... 429/220; 429/221; 429/231.5; 429/231.9
[58] Field of Search ...................... 429/218, 219, 429/220, 221, 223, 224, 229, 231.5, 231.9

[56] References Cited

U.S. PATENT DOCUMENTS

| | | | |
|---|---|---|---|
| 5,229,226 | 7/1993 | Bito et al. | 429/218 X |
| 5,358,805 | 10/1994 | Fujimoto et al. | 429/223 X |

FOREIGN PATENT DOCUMENTS

| | | |
|---|---|---|
| 5-217582 | 8/1993 | Japan . |
| 06 290 782 | 10/1994 | Japan . |
| 7-254404 | 1/1995 | Japan . |
| 7-307152 | 11/1995 | Japan . |
| 08 106 900 | 4/1996 | Japan . |
| 08 190 909 | 7/1996 | Japan . |
| 09 045312 | 2/1997 | Japan . |
| WO 96 34825 | 11/1996 | WIPO . |

*Primary Examiner*—Stephen Kalafut
*Attorney, Agent, or Firm*—McDermott, Will & Emery

[57] ABSTRACT

The invention provides a nonaqueous electrolyte secondary battery which employs, as a negative electrode active material, a carbide containing an alkali metal in a charged stage. The carbide used is an ionic bond type carbide, a covalent bond type carbide, or an intermetallic compound type carbide. The ionic bond type carbide is exemplified as $Na_2C_2$, $K_2C_2$, $Cu_2C_2$, $VC_2$, and the like. The covalent bond type carbide is exemplified as $Cr_4C$, and the like. The intermetallic compound type carbide is exemplified as $Mn_3C$, $Mn_{23}C_6$, $Mn_7C_3$, $Fe_2C$, FeC, $Ni_3C$, and the like. A highly reliable nonaqueous electrolyte secondary battery with a high energy density and excellent cycle life characteristics can be obtained.

6 Claims, 2 Drawing Sheets

NONAQUEOUS ELECTROLYTE SECONDARY BATTERY

BACKGROUND OF THE INVENTION

The present invention relates to a nonaqueous electrolyte secondary battery, particularly an improvement of the negative electrode thereof.

Nonaqueous electrolyte secondary batteries having a negative electrode of alkali metal, such as lithium or sodium, has a high electromotive force, and, thus, are expected to provide a higher energy density than that of conventional nickel-cadmium or lead acid storage batteries. Many vigorous studies have been made on the nonaqueous electrolyte secondary batteries, particularly those having negative electrodes of lithium.

However, batteries using negative electrodes of metallic alkali metals may suffer dendrite growth during charging operation. This leads to short-circuiting, thereby decreasing the reliability of the battery.

In order to solve this problem, the availability of a negative electrode comprising an alloy of lithium and aluminum or lead has been investigated. In the batteries which employ the negative electrode of this alloy, lithium is absorbed in the alloy during charging operation and dendrite growth does not occur. Thus, a highly reliable battery can be obtained.

However, since the discharge potential of the negative electrode of this alloy is higher than that of metallic lithium by about 0.5 V, the voltage of the battery including this negative electrode decreases by about 0.5 V accordingly. As a result, the energy density of the battery also decreases.

On the other hand, it has been investigated to use intercalation compounds between lithium and carbon, such as graphite, as an active material for the negative electrode. The negative electrode made of intercalation compound is also free from dendrite growth, because lithium is intercalated between the layers of carbon during charging. The negative electrode has about 0.1 V higher discharge potential, compared with metallic lithium, and the battery shows less decrease in voltage. Such negative electrode is considered more preferable. However, this negative electrode active material has a significant drawback as follows. The capacity of intercalating lithium into the interlayer space of carbon is theoretically limited to the quantity defined by the formula $C_6Li$ at the maximum (available electric capacity is 372 Ah/kg) in the case of graphite. Carbon, a lower crystalline material than graphite, has been proposed extensively as an active material having a capacity of intercalating lithium exceeding the above-mentioned theoretical value.

The above-mentioned carbon materials have unsatisfactory discharge capacities and the capacity decreases greatly with the advance of charge-discharge cycles.

The primary object of the present invention is to provide a negative electrode which realizes a nonaqueous electrolyte secondary battery with a high electric capacity and an exceptionally long cycle life by absorbing lithium during charging operation, thereby preventing lithium from growing dendrites.

Another object of the present invention is to provide a highly reliable nonaqueous electrolyte secondary battery with an even higher energy density and an exceptional cycle life characteristic free from short-circuiting due to dendrites.

BRIEF SUMMARY OF THE INVENTION

The present invention provides a nonaqueous electrolyte secondary battery comprising a positive electrode and a negative electrode both of which have reversibility for charging and discharging, and a nonaqueous electrolyte containing alkali metal ions, the negative electrode comprising a carbide which contains an alkali metal in charged state.

The alkali metal contained in the carbide is at least either one of lithium or sodium.

The negative electrode of this configuration has a high capacity and an exceptionally long cycle life. With the use of such negative electrode, it is possible to provide a highly reliable nonaqueous electrolyte secondary battery with a higher energy density and an excellent cycle life, free from short-circuiting due to dendrites.

As discussed above, the present invention uses the negative electrode comprising a carbide that contains an alkali metal in charged state.

In a preferred mode of the present invention, the carbide is an ionic bond type carbide, a covalent bond type carbide, or an intermetallic compound type carbide.

Here, the ionic bond type carbide is a carbide of at least one element selected from the group consisting of aluminum, sodium, potassium, copper, silver, magnesium, calcium, zinc, and vanadium. The carbide may be exemplified as $Al_4C_3$, $Al_2C_6$, $Na_2C_2$, $K_2C_2$, $Cu_2C_2$, $Ag_2C_2$, $MgC_2$, $Mg_2C_3$, $CaC_2$, $ZnC_2$, and $VC_2$.

The covalent bond type carbide is a carbide of at least one element selected from the group consisting of silicon, boron, and chromium. The carbide may be exemplified as SiC, $B_{12}C_3$, $Cr_3C_2$, $Cr_7C_3$, and $Cr_4C$, The intermetallic compound type carbide is a carbide of at least one element selected from the group consisting of titanium, vanadium, molybdenum, tungsten, manganese, iron, cobalt, and nickel. The carbide may be exemplified as TiC, VC, $V_4C_3$, $V_5C$, MoC, $Mo_2C$, WC, $W_2C$, $Mn_3C$, $Mn_{23}C_6$, $Mn_7C_3$, $Fe_3C$, $Fe_2C$, FeC, $Co_3C$, $Co_2C$, $CoC_2$, and $Ni_3C$.

In general, carbides are compounds of carbon with more electropositive elements. Carbides are classified into three types according to the elements which combine with carbon: compounds with strong electropositive elements (the above-mentioned ionic bond type carbides belong to this category), compounds with less electropositive elements having a small atomic radius (the above-mentioned covalent bond type carbides belong to this category), and compounds with elements having a large atomic radius (the above-mentioned intermetallic compound type carbides belong to this category).

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention will be described more specifically by way of examples.

EXAMPLE 1

Figure 1:
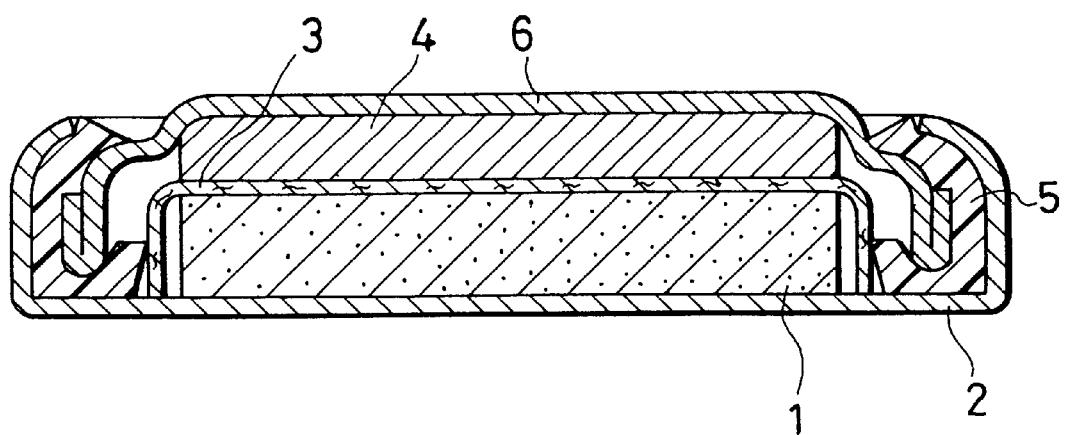
FIG. 1 shows a schematic longitudinal cross-sectional view of a test cell for evaluating the characteristics of the electrode including the active material in accordance with the present invention.

First, test cells as shown in FIG. 1 were prepared for evaluating the characteristics of the carbides $Al_4C_3$, $Al_2C_6$, $Na_2C_2$, $K_2C_2$, $Cu_2C_2$, $Ag_2C_2$, $MgC_2$, $Mg_2C_3$, $CaC_2$, $ZnC_2$, and $VC_2$ as negative electrode active materials. Graphite was used as the active material for a comparative example.

10 g of each active material were mixed with 1 g of a polyethylene powder as a binder to prepare an electrode mixture. 0.1 g of the mixture was pressure-molded to a disc of 17.5 mm in diameter. In this way, electrodes of Example 1 were obtained.

FIG. 1 shows the test cell applied with the electrode thus prepared. An electrode 1 is positioned in the center of a case 2, and a microporous polypropylene separator 3 was disposed thereon. Then, a mixture of ethylene carbonate and dimethoxyethane in a volumetric ratio of 1:1 dissolving 1 mol/l lithium perchlorate ($LiClO_4$) as the nonaqueous electrolyte was poured over the separator. Separately, a sealing plate 6 having a metallic lithium sheet 4 of 17.5 mm in diameter adhered to the inner side and a polypropylene gasket 5 mounted in the periphery was prepared, and combined with the case 2 to assemble a test cell.

Each test cell was cathodically polarized at a constant current of 2 mA until the voltage of the electrode became 0 V vs. the Li counter electrode (if the active material electrode is taken as the negative electrode, then this operation corresponds to charging). Then, the test cells were anodically polarized until the voltage of the electrode became 1.0 V vs. the Li counter electrode (similarly, this operation corresponds to discharge). After cathode and anode polarization was repeated, the characteristics of each electrode were evaluated. Subsequently, charge-discharge was repeated 100 cycles, and changes in discharge capacity with the progress of cycle were measured. Table 1 lists the initial discharge capacity and the ratio of discharge capacity after 100 cycles to the initial discharge capacity, that is, the maintenance rate of the discharge capacity of each test cell.

It is seen that the test cells of Example 1 have a very large discharge capacity, and that while decrease in capacity with the progress of cycle is very large in the test cell of the comparative example, the test cells of Example 1 show substantially no decrease.

Upon completion of cathode polarization at 100th cycle, each test cell was disassembled. As a result, no deposits of metallic lithium were found in any cell.

The above results show that the electrodes of Example 1, which employed carbides as the active material, absorb therein lithium in response to cathode polarization and desorb therefrom the absorbed lithium in response to anode polarization, resulting in no deposition of metallic lithium, and thus can have exceptionally large charge-discharge capacities and excellent charge-discharge cycle characteristics.

TABLE 1

| Active material | Discharge capacity (mAh/g) | Maintenance rate of discharge capacity at 100th cycle (%) |
|---|---|---|
| $Al_4C_3$ | 550 | 95 |
| $Na_2C_2$ | 520 | 95 |
| $K_2C_2$ | 550 | 95 |
| $Cu_2C_2$ | 500 | 90 |
| $Ag_2C_2$ | 520 | 90 |
| $MgC_2$ | 500 | 90 |

TABLE 1-continued

| Active material | Discharge capacity (mAh/g) | Maintenance rate of discharge capacity at 100th cycle (%) |
|---|---|---|
| $Mg_2C_3$ | 500 | 90 |
| $CaC_2$ | 530 | 90 |
| $ZnC_2$ | 500 | 90 |
| $Al_2C_6$ | 500 | 92 |
| $VC_2$ | 510 | 95 |
| Graphite (Comparative example) | 350 | 50 |

EXAMPLE 2

In the present example, for evaluating the characteristics of the carbides SiC, $B_{12}C_3$, $Cr_3C_2$, $Cr_7C_3$, and $Cr_4C$ as negative electrode active materials, test cells as shown in FIG. 1 were prepared and tested in the same manner as in Example 1 under the same conditions. The results are shown in Table 2.

It is seen that the test cells of Example 2 have a very large discharge capacity, and that while decrease in capacity with the progress of cycle is very large in the test cell of the comparative example, the test cells of Example 2 show substantially no decrease.

Upon completion of cathode polarization at 100th cycle, each test cell was disassembled. As a result, no deposits of metallic lithium were found in any cell.

The above results show that the electrodes of Example 2, which employed carbides as the active material, absorb therein lithium in response to cathode polarization and desorb therefrom the absorbed lithium in response to anode polarization, resulting in no deposition of metallic lithium, and thus can have exceptionally large charge-discharge capacities and excellent charge-discharge cycle characteristics.

TABLE 2

| Active material | Discharge capacity (mAh/g) | Maintenance rate of discharge capacity at 100th cycle (%) |
|---|---|---|
| SiC | 550 | 95 |
| $B_{12}C_3$ | 520 | 95 |
| $Cr_3C_2$ | 500 | 95 |
| $Cr_7C_3$ | 500 | 95 |
| $Cr_4C$ | 500 | 95 |
| Graphite (Comparative example) | 350 | 50 |

EXAMPLE 3

In the present example, for evaluating the characteristics of the carbides TiC, VC, $V_4C_3$, $V_5C$, MoC, $Mo_2C$, WC, $W_2C$, $Mn_3C$, $Mn_{23}C_6$, $Mn_7C_3$, $Fe_3C$, $Fe_2C$, FeC, $Co_3C$, $Co_2C$, $CoC_2$, and $Ni_3C$ as negative electrode active materials, test cells as shown in FIG. 1 were prepared and tested in the same manner as in Example 1 under the same conditions. The results are shown in Table 3.

It is seen that the test cells of Example 3 have a very large discharge capacity, and that while decrease in capacity with the progress of cycle is very large in the test cell of the comparative example, the test cells of Example 3 show substantially no decrease.

Upon completion of cathode polarization at 100th cycle, each test cell was disassembled. As a result, no deposits of metallic lithium were found in any cell.

The above results show that the electrodes of Example 3, which employed carbides as the active material, absorb therein lithium in response to cathode polarization and desorb therefrom the absorbed lithium in response to anode polarization, resulting in no deposition of metallic lithium, and thus can have exceptionally large charge-discharge capacities and excellent charge-discharge cycle characteristics.

TABLE 3

| Active material | Discharge capacity (mAh/g) | Maintenance rate of discharge capacity at 100th cycle (%) |
|---|---|---|
| TiC | 520 | 95 |
| VC | 550 | 95 |
| $V_4C_3$ | 550 | 95 |
| $V_5C$ | 550 | 95 |
| MoC | 540 | 95 |
| $Mo_2C$ | 520 | 92 |
| WC | 520 | 95 |
| $W_2C$ | 500 | 95 |
| $Mn_{23}C_6$ | 520 | 92 |
| $Mn_7C_3$ | 520 | 92 |
| $Mn_3C$ | 520 | 92 |
| $Fe_3C$ | 510 | 95 |
| $Fe_2C$ | 510 | 95 |
| FeC | 510 | 95 |
| $Co_3C$ | 550 | 92 |
| $Co_2C$ | 550 | 92 |
| $CoC_2$ | 550 | 92 |
| $Ni_3C$ | 520 | 95 |
| Graphite (Comparative example) | 350 | 90 |

EXAMPLE 4

Figure 2:
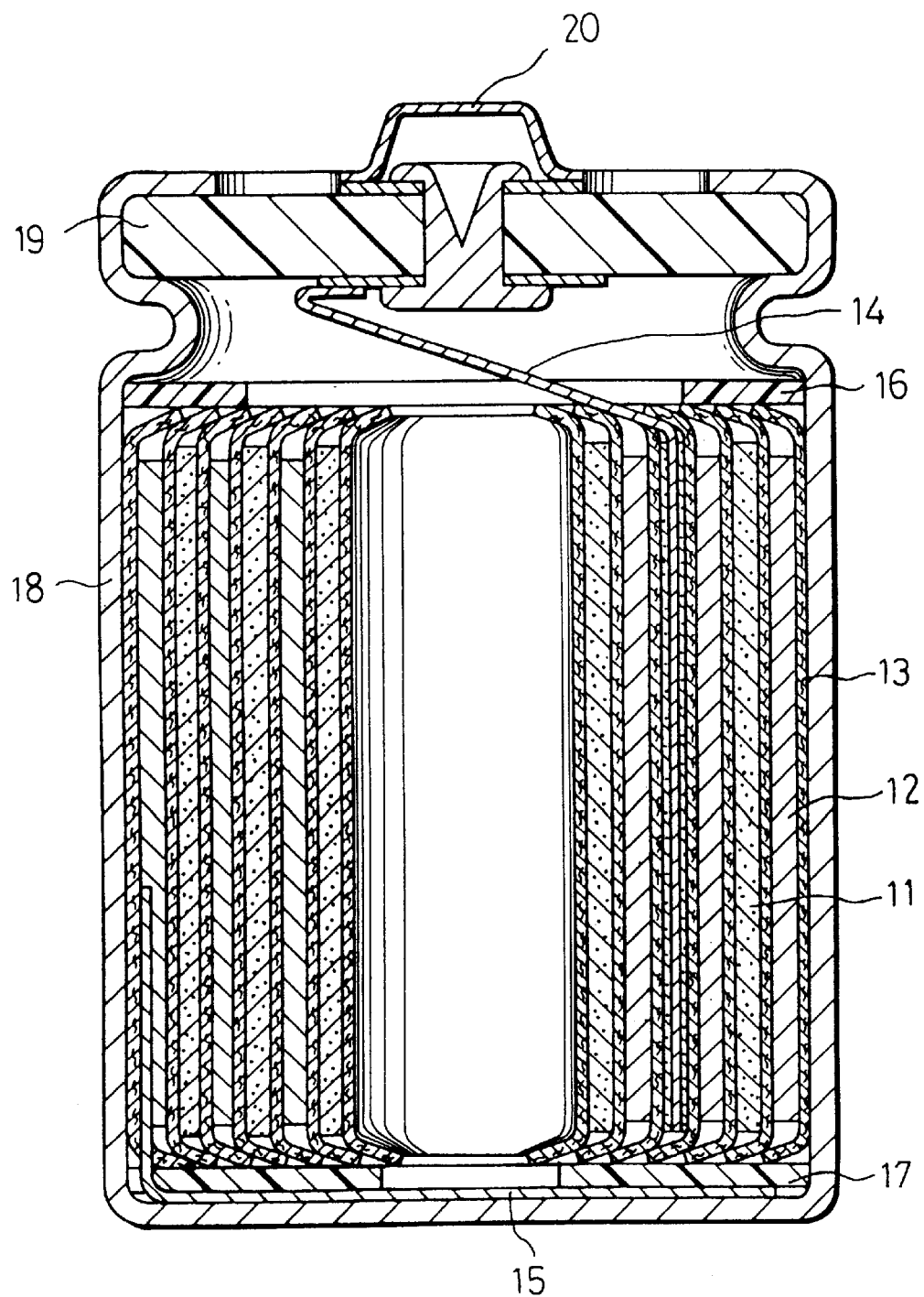
FIG. 2 shows a longitudinal cross-sectional view of a cylindrical battery of one example in accordance with the present invention.

In the present example, cylindrical batteries as shown in FIG. 2 were prepared using negative electrodes of $Al_4C_3$, $Al_2C_6$, $Na_2C_2$, $K_2C_2$, $Cu_2C_2$, $Ag_2C_2$, $MgC_2$, $Mg_2C_3$, $CaC_2$, $ZnC_2$, and $VC_2$ as active materials, and their characteristics were evaluated. Graphite was used as the negative electrode active material for a comparative example.

The battery was prepared in the following manner.

First, $Li_2CO_3$, $Mn_3O_4$ and $CoCo_3$ were mixed at a predetermined molar ratio, and the mixture was heated at 900° C. to synthesize a positive electrode active material $LiMn_{1.8}Co_{0.2}O_4$. The positive electrode active material was then filtered, and fine particles of 100 mesh or less were collected and used as the positive electrode active material of Example 4.

100 g of the positive electrode active material thus obtained were mixed with 10 g of a carbon powder as a conductive agent, an aqueous dispersion of polytetrafluoroethylene as a binder (8 g as resin contents), and pure water, and the mixture was made to a paste. The paste was applied onto a titanium core, dried and rolled out. In this way, a positive electrode was obtained. The positive electrode includes 5 g of the active material.

Separately, negative electrodes were prepared as follows. 100 g of a powder of each of the above-mentioned carbide active materials were mixed with a teflon binder at a weight ratio of 100:5. The mixture was mixed with a petroleum solvent to prepare a paste. The paste was applied onto a copper core and then dried at 100° C., which gave a negative electrode plate. Each negative electrode included 2 g of the carbide powder.

A positive electrode plate 11 and a negative electrode plate 12 were spirally rolled up together, with a microporous polypropylene separator 13 interposed therebetween. The electrode group thus assembled was housed in a metallic battery case 18, with polypropylene insulating plates 16, 17 disposed on the upper and lower ends thereof. After a reduced diameter step was formed near the upper part of the battery case 18, the case 18 was injected with a nonaqueous electrolyte of a mixture of ethylene carbonate and dimethoxyethane at a volumetric ratio of 1:1 dissolving 1 mol/l lithium perchlorate. Then, the battery case was sealed with a sealing plate 19 with a positive electrode terminal 20. A positive electrode lead 14 made of the same material as that of the core connected to the positive electrode terminal 20 and a negative electrode lead 15 made of the same material as that of the core connected to the negative electrode plate 12 were connected to the battery case 18, respectively.

The positive electrode of the battery thus assembled has a larger electric capacity than that of the negative electrode, and the capacity of the battery depends on the capacity of the negative electrode.

Charge-discharge cycle test was carried out in the batteries having negative electrodes of the above-mentioned carbide active materials with a charge-discharge current of 0.5 mA/cm² at a charge-discharge voltage in a range of 4.3 to 3.0 V. Table 4 lists the initial capacity and maintenance rate of the capacity after 100 cycles of each battery.

It is seen that the batteries of Example 4 have a very large electric capacity, and that they have even superior cycle life characteristics to those of the comparative example. Upon completion of charging at 100th cycle, each battery was disassembled to examine the presence of deposits of metallic lithium. As a result, no deposits of lithium were found in any battery.

Similar excellent results were obtained with the carbides SiC, $B_{12}C_3$, $Cr_3C_2$, $Cr_7C_3$, $Cr_4C$, TiC, VC, $V_4C_3$, $V_5C$, MoC, $Mo_2C$, WC, $W_2C$, $Mn_3C$, $Mn_{23}C_6$, $Mn_7C_3$, $Fe_3C$, $Fe_2C$, FeC, $Co_3C$, $Co_2C$, $CoC_2$, and $Ni_3C$.

TABLE 4

| Active material | Discharge capacity (mAh/g) | Maintenance rate of discharge capacity at 100th cycle (%) |
|---|---|---|
| $Al_4C_3$ | 550 | 95 |
| $Na_2C_2$ | 520 | 95 |
| $K_2C_2$ | 520 | 95 |
| $Cu_2C_2$ | 510 | 90 |
| $Ag_2C_2$ | 550 | 90 |
| $MgC_2$ | 520 | 90 |
| $Mg_2C_3$ | 520 | 90 |
| $CaC_2$ | 510 | 90 |
| $ZnC_2$ | 520 | 90 |
| $Al_2C_6$ | 540 | 92 |
| $VC_2$ | 520 | 95 |
| Graphite (Comparative example) | 350 | 50 |

EXAMPLE 5

The availability of sodium as an alkali metal absorbed in the negative electrode by charging was examined in the present example, instead of lithium in the foregoing examples. Cylindrical batteries as shown in FIG. 2 were prepared under the same conditions as those of Example 4 with respect to the weight and composition ratio, except for the use of $NaNiO_2$ as the positive electrode active material and γ-butyrolactone dissolving 1 mol/l sodium perchlorate (NaClO.) as the nonaqueous electrolyte. The positive electrode of each battery has a larger electric capacity than that of the negative electrode, and the capacity of the battery depends on the capacity of the negative electrode.

Charge-discharge cycle test was carried out in these batteries with the charge-discharge current of 0.5 mA/cm² at the charge-discharge voltage in a range of 4.3 to 3.0 V. Table 5 lists the initial capacity and maintenance rate of the capacity after 100 cycles of each battery.

TABLE 5

| Active material | Discharge capacity (mAh/g) | Maintenance rate of discharge capacity at 100th cycle (%) |
|---|---|---|
| $Al_4C_3$ | 550 | 95 |
| $Al_2C_6$ | 550 | 95 |
| $Na_2C_2$ | 520 | 95 |
| $K_2C_2$ | 520 | 95 |
| $Cu_2C_2$ | 510 | 90 |
| $Ag_2C_2$ | 550 | 90 |
| $MgC_2$ | 520 | 90 |
| $Mg_2C_3$ | 520 | 90 |
| $CaC_2$ | 510 | 90 |
| $ZnC_2$ | 520 | 90 |
| $Al_2C_6$ | 540 | 92 |
| $VC_2$ | 520 | 95 |
| Graphite (Comparative example) | 350 | 50 |

The batteries of Example 5 have exceptionally large electric capacities and excellent cycle life characteristics compared with the comparative example.

Upon completion of charging at 100th cycle, each battery was disassembled. As a result, no deposits of metallic sodium were found in any of the batteries of Example 5 and comparative example.

Similar excellent results were obtained with the carbides SiC, $B_{12}C_3$, $Cr_3C_2$, TiC, VC, MoC, $Mo_2C$, WC, $W_2C$, $Mn_3C$, $Fe_3C$, $Co_3C$, and $Ni_3C$.

In the foregoing examples, cylindrical batteries were used for testing, the present invention is not limited to this configuration. The same effects may be obtained with any of coin-shaped, rectangular, and flat secondary batteries.

According to the present invention, it is possible to realize a highly reliable nonaqueous electrolyte secondary battery with an even higher energy density and free from short-circuiting due to dendrites with the use of negative electrodes having a very high capacity and an exceptionally long cycle life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A nonaqueous electrolyte secondary battery comprising a positive electrode and a negative electrode both of which have reversibility for charging and discharging, and a nonaqueous electrolyte containing alkali metal ions, said negative electrode including a carbide which contains an alkali metal in a charged state, wherein said carbide is a carbide of at least one element selected from the group consisting of sodium, potassium, copper, and manganese.

2. A nonaqueous electrolyte secondary battery comprising a positive electrode and a negative electrode both of which have reversibility for charging and discharging, and a nonagueous electrolyte containing alkali metal ions, said negative electrode including a carbide which contains an alkali metal in a charged state, wherein said carbide is at least one selected from the group consisting of $Cr_1C$, $VC_2$, $Fe_2C$, and FeC.

3. The nonaqueous electrolyte secondary battery in accordance with claim 1, wherein said carbide is at least one selected from the group consisting of $Na_2C_2$, $K_2C_2$, and $Cu_2C_2$.

4. The nonaqueous electrolyte secondary battery in accordance with claim 1, wherein said carbide is at least one selected from the group consisting of $Mn_3C$, $Mn_{23}C_6$, and $Mn_7C_3$.

5. The nonaqueous electrolyte secondary battery in accordance with claim 1, wherein said alkali metal is at least one of lithium and sodium.

6. The nonaqueous electrolyte secondary battery in accordance with claim 2, wherein said alkali metal is at least one of lithium and sodium.

* * * * *